United States Patent
McGaughy et al.

(10) Patent No.: US 10,001,966 B1
(45) Date of Patent: Jun. 19, 2018

(54) SYSTEMS AND METHODS FOR SEQUENCING AUDIO COMMUNICATIONS

(71) Applicant: Rockwell Collins, Inc., Cedar Rapids, IA (US)

(72) Inventors: Ellen L. McGaughy, Cedar Rapids, IA (US); Bandi B. Reddy, Marion, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 0 days. days.

(21) Appl. No.: 15/002,336

(22) Filed: Jan. 20, 2016

(51) Int. Cl.
*G06F 3/16* (2006.01)

(52) U.S. Cl.
CPC .................. *G06F 3/165* (2013.01)

(58) Field of Classification Search
CPC ..... H04M 11/08; H04M 11/02; G10L 19/167; G06F 3/165
See application file for complete search history.

(56) References Cited

U.S. PATENT DOCUMENTS

| | | | | |
|---|---|---|---|---|
| 7,324,003 B2* | 1/2008 | Yun | .................. | H04H 20/59 340/601 |
| 7,941,198 B2* | 5/2011 | Richey | ................. | H04B 1/3805 455/3.01 |
| 9,338,565 B2* | 5/2016 | Hansen | .................. | G09B 21/04 |
| 9,386,369 B2* | 7/2016 | Kimura | .................. | G03B 31/00 |
| 2003/0223599 A1* | 12/2003 | Abe | .................... | G10L 21/0208 381/119 |
| 2005/0170808 A1* | 8/2005 | Hamilton | ............ | H04L 12/2854 455/404.1 |
| 2005/0191958 A1* | 9/2005 | Hoskins | ............... | H04B 17/309 455/3.01 |
| 2007/0030585 A1* | 2/2007 | Gibson | .................... | H04B 1/16 360/63 |
| 2011/0189943 A1* | 8/2011 | Ilarregui | ............ | H04B 7/18508 455/7 |
| 2016/0269565 A1* | 9/2016 | Gauduin | ............ | H04B 7/18506 |

* cited by examiner

*Primary Examiner* — Mohammad Islam
(74) *Attorney, Agent, or Firm* — Donna P. Suchy; Daniel M. Barbieri (57) ABSTRACT

An audio sequencing device includes an input circuit, a prioritizing circuit, a playback circuit, and an output circuit. The input circuit is receives a first audio signal from a first audio source and a second audio signal from a second audio source. The prioritizing circuit assigns a first priority to the first audio signal and a second priority to the second audio signal. The playback circuit sequences at least one of the audio signals based on at least one of an order of receiving the audio signals and the assigned priorities. The output circuit transmits the audio signals to a user device one at a time based on the sequence and the assigned priorities of the audio signals.

20 Claims, 4 Drawing Sheets

SYSTEMS AND METHODS FOR SEQUENCING AUDIO COMMUNICATIONS

BACKGROUND

Inventive concepts of the present disclosure relate generally to the field of audio communications systems. More particularly, the inventive concepts of the present disclosure relate to processing and playing back multiple sources of audio communications.

Aircrafts typically include communications systems that enable a flight crew to communicate amongst themselves, with other aircraft, and with ground stations, such as air traffic control stations. Aircrafts may also include other systems that provide audible communications to the aircraft crew members. For example, aircraft typically include an engine-indicating and crew-alerting system ("EICAS") that provides crew members with visual and audio alerts regarding diagnostic information about the aircraft and to warn aircraft crew members of dangerous conditions or to provide instructions to aircraft crew members. Some communications systems, such as typical aircraft communications systems, utilize a party line communications system (e.g., party wire, multiparty line, shared service line) allowing all devices and members on a communication line to simultaneously communicate with each other. In some instances, for example, a pilot may receive simultaneous audio communications from an EICAS, an air traffic control tower, another member of the cockpit (e.g., a co-pilot or navigator), and other members of the flight crew (e.g., a flight attendant or passenger in the cabin). The simultaneous communications may overlap one another or otherwise disrupt the pilot's ability to hear or comprehend all incoming audio or important portions of the audio. In some cases, a less important communication (e.g., a flight attending asking the pilot if he would like a drink) may overlap with or otherwise interfere with a more important communication (e.g., the EICAS audibly instructing the pilot to "pull up" due to the aircraft dropping to an unsafe altitude). Accordingly, receiving communications from multiple audio sources simultaneously may cause the pilot or other aircraft crew members to miss or otherwise not comprehend each communication.

A need exists for systems and methods for ensuring that all communications originating from members and devices on a party line communications system are received by aircraft crew members and other interested parties. A further need exists for preserving communications that are simultaneously received by aircraft communication devices.

SUMMARY

In one aspect, embodiments of the inventive concepts disclosed herein are directed to an audio sequencing device. The audio sequencing device includes an input circuit configured to receive a plurality of audio signals, including a first audio signal from a first audio source and a second audio signal from a second audio source. The audio sequencing device further includes a prioritizing circuit configured to assign a first priority to the first audio signal and a second priority to the second audio signal. The audio sequencing device further includes a playback circuit configured to sequence at least one of the audio signals of the plurality of audio signals based on at least one of an order of receiving the audio signals and the assigned priorities. The audio sequencing device further includes an output circuit configured to transmit the audio signals to a user device one at a time based on the sequence and the assigned priorities of the audio signals.

In a further aspect, embodiments of the inventive concepts disclosed herein are directed to a method of sequencing audio communication signals. The method includes receiving, by an input circuit of a communications sequencing device, a plurality of audio signals, including a first audio signal from a first audio source and a second audio signal from a second audio source. The method further includes assigning, by a prioritizing circuit of the communications sequencing device, a first priority to the first audio signal and a second priority to the second audio signal in response to at least a portion of the first audio signal overlapping at least a portion of the second audio signal. The method further includes sequencing, by a playback circuit of the communications sequencing device, at least one of the audio signals of the plurality of audio signals based on at least one of an order of receiving the audio signals and the assigned priorities. The method further includes outputting, by an output circuit of the communications sequencing device, the audio signals to a user device one at a time based on the sequence and the assigned priority of the audio signals.

In a further aspect, embodiments of the inventive concepts disclosed herein are directed to a communications system. The communications system includes a plurality of audio communication devices configured to simultaneously transmit audio signal and at least one processor communicably coupled with the plurality of audio communication devices and a non-transitory processor-readable medium storing processor-executable code. The processor-executable code causes the at least one processor to simultaneously receive an audio signal from each audio communication device of the plurality of audio communication devices. The processor-executable code further causes the at least one processor to assign a priority to each audio signal based on at least one of a characteristic of at least one of the audio sources and a characteristic of at least one of the audio signals, wherein the priority is assigned in response to at least a portion of a first audio signal of the plurality of audio signals overlapping at least a portion of a second audio signal of the plurality of audio signals. The processor-executable code further causes the at least one processor to sequence at least one of the audio signals for playback based on at least one of an order of receiving the audio signals and the assigned priorities. The processor-executable code further causes the at least one processor to output the audio signals to a user device one at a time based on the sequence and the assigned priorities of the audio signals.

BRIEF DESCRIPTION OF THE DRAWINGS

Implementations of the inventive concepts disclosed herein may be better understood when consideration is given to the following detailed description thereof. Such description makes reference to the included drawings, which are not necessary to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

A party line communications system may be used in various applications, including those where simultaneous communications may occur among various devices and participants. Due to simultaneous communications (e.g., multiple sources talking over one another), the party line communications system may facilitate unreliable and/or disrupted communications at times. Accordingly, the systems and methods for sequencing audio communications disclosed herein include communications systems configured to provide a prioritized audio output to participants and listeners on an audio line, thereby facilitating information transfer among the various sources without interruption. The communications systems include a prioritizing circuit configured to receive audio inputs from participants of a conversation and to prioritize the received communications for output to the listeners of the conversation and others. In some embodiments, the communications system includes a playback circuit configured to provide the prioritized audio output to participants of the conversation and to store at least some of the communications in a memory to delay playback of less important communications having lower priorities than other communications that are immediately provided to participants of the conversation.

Figure 1:
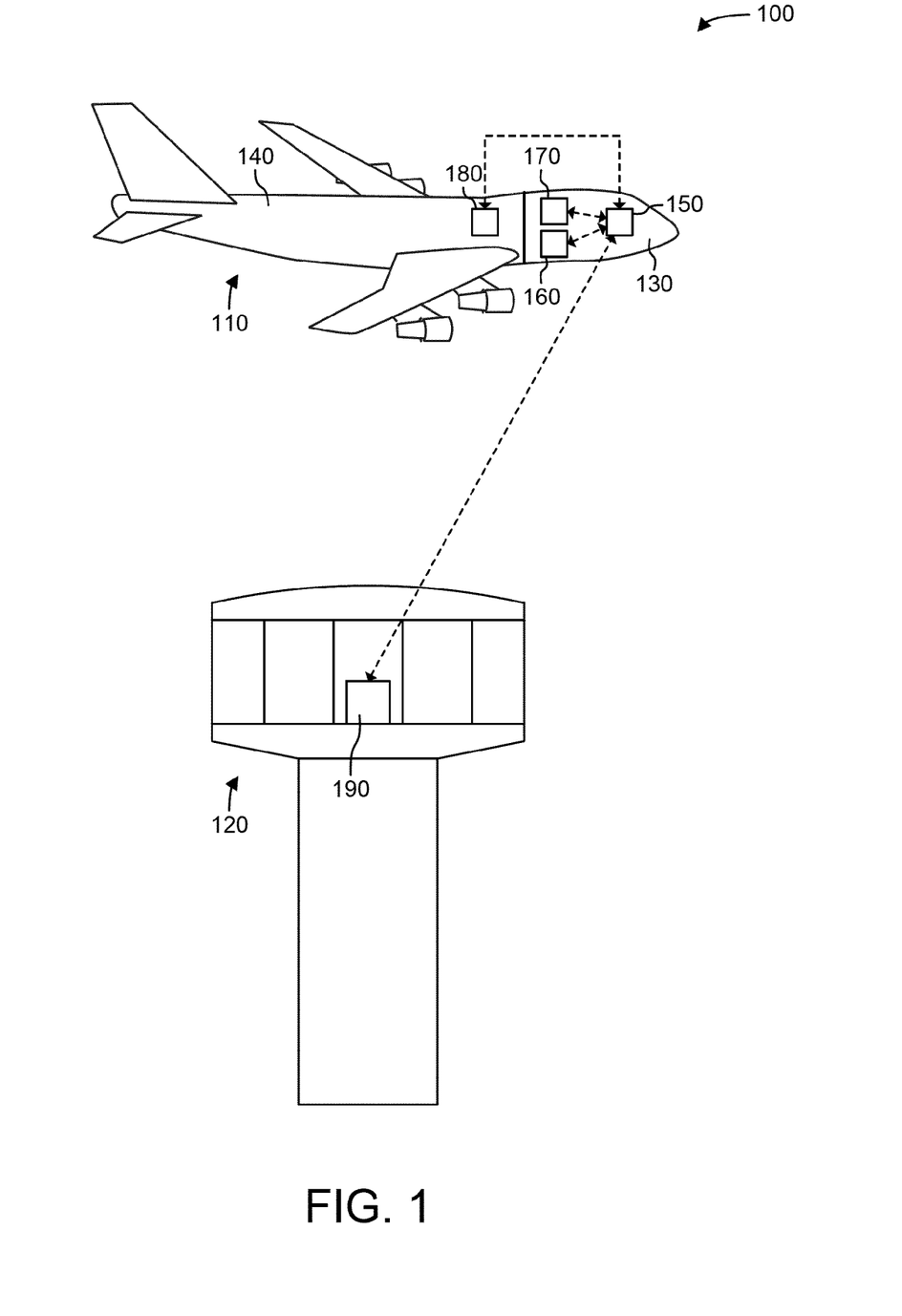
FIG. 1 is an exemplary embodiment of a communications network including an aircraft having a communications sequencing device, according to the inventive concepts disclosed herein.

Referring to FIG. 1, an exemplary embodiment of a communications network 100 including an aircraft 110 having a communications sequencing device 150 is shown according to the inventive concepts disclosed herein. The communications network 100 includes a number of communication devices onboard the aircraft 110, including a first communication device 160, a second communication device 170, and a third communication device 180. In some embodiments, the communications network 100 includes an air traffic control tower 120 having a fourth communication device 190. In some embodiments, the aircraft 110 includes a cockpit 130 (e.g., aircraft control center) and a cabin 140 that may or may not be sonically isolated from one another. In some embodiments, the communications network 100 may further include additional communication device associated with any potential sources of audio, such as a satellite communications system, a terrestrial station, Aeronautical Operational Control, and other aircraft.

According to various embodiments, the communications network 100 is a party line (e.g., party wire, multiparty line, shared service line) communications network configured to facilitate simultaneous communication between a number of audio sources (e.g., the first communication device 160, the second communication device 170, the third communication device 180, and the fourth communication device 190). Each communication device may be associated with a specific person, station, device, or area. For example, the first communication device 160 may be associated with a pilot of the aircraft 110, the second communication device 170 may be associated with a co-pilot of the aircraft 110, the third communication device 180 may be associated with a cabin of the aircraft (e.g., and configured to enable flight attendants and passengers to communicate with devices located in the cockpit 130 or other devices). The communications sequencing device 150 may also be configured to receive audio from an EICAS located onboard the aircraft 110. For example, the EICAS may provide audio relating to critical operational information for various engine parameters and aircraft systems, such as runway awareness warning systems, traffic collision and avoidance systems, terrain awareness warning systems, hydraulic systems, pneumatic systems, electrical systems, deicing systems, environmental systems, and control surface systems. In some embodiments, the communications sequencing device 150 is operable by the pilot of the aircraft 110 or other aircraft crew member to communicate with another aircraft, an airline company, an Automatic Terminal Information Services, or Flight Information Center.

In some embodiments, the communications sequencing device 150 is communicably connected with the first communication device 160, the second communication device 170, the third communication device 180, and the fourth communication device 190. The communications sequencing device 150 is configured to receive audio signals from each device and to output audio signals to each device. The audio signals may include navigation information, aircraft system information, vocal interpersonal communication between flight crew members and others, situational information of the aircraft 110, weather information, and other communication information. In some embodiments, the communications sequencing device 150 relays the received audio signals to the pilot of the aircraft 110 via an audio output device, such as a speaker or headphones. In one embodiment, the communications sequencing device 150 outputs audio signals to the pilot of the aircraft 110 via a headset, helmet, or cockpit voice recorder.

In operation, for example, the communications network 100 may facilitate a transfer of navigation information from the fourth communication device 190 to a receiver configured as an audio input source to the communications sequencing device 150 and onto to the listener (e.g., a participant or device such as the first communication device 160). In another example, the communications network 100 may facilitate simultaneous communications from each of the following: the second communication device 170, the third communication device 180, and the fourth communication device 190 to the first communication device 160 via the communications sequencing device 150. In some embodiments, multiple communication devices may transmit audio signals at the same time. For example, the co-pilot may use the second communication device 170 to transmit audio signals including critical information about performance characteristics of the aircraft 110 to the first communication device 160 while a flight attendant simultaneously uses the third communication device 180 to transmit non-critical information about food service onboard the aircraft 110 to the first communication device 160. In such a situation, the communications sequencing device 150 may be configured to sequence the incoming audio signals such that the critical information transmitted by the second communication device 170 is properly heard or understood by the pilot. The communications sequencing device 150 may be configured to determine that the conversation provided by the flight attendant is not critical and may distract the pilot from hearing the audio signals from the second communication device 170 or that the pilot may be unable to adequately hear the audio signals from the second communication device 170 due to the incoming communications signals potentially overlapping or otherwise disrupting one another.

Figure 2:
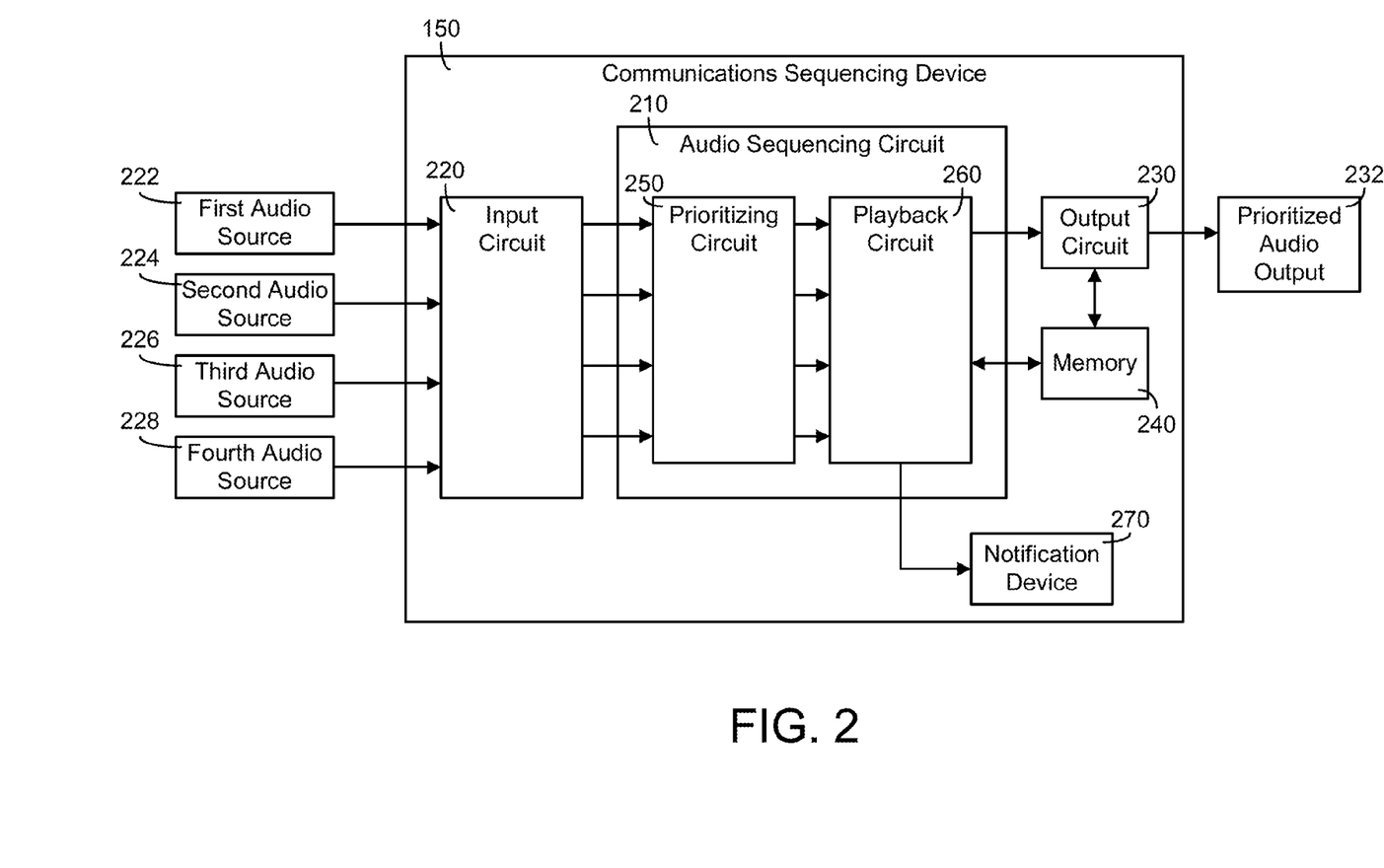
FIG. 2 is an exemplary embodiment of the communications sequencing device of FIG. 1 including an audio sequencing circuit, according to the inventive concepts disclosed herein.

Referring now to FIG. 2, an exemplary embodiment of the communications sequencing device 150 of FIG. 1 including an audio sequencing circuit 210 is shown according to the inventive concepts disclosed herein. The communications sequencing device 150 further includes an input circuit 220, an output circuit 230, a memory 240, and a notification device 270. The audio sequencing circuit 210 includes a prioritizing circuit 250 and a playback circuit 260. The input circuit 220, the prioritizing circuit 250, the playback circuit 260, the output circuit 230, the memory 240, and the notification device 270 are each communicably coupled with one another.

The input circuit 220 is configured to receive a plurality of audio inputs from a plurality of audio devices. As shown in FIG. 2, the input circuit 220 is configured to receive a first audio source 222, a second audio source 224, a third audio source 226, and a fourth audio source 228. Each of the audio sources 222, 224, 226, 228 may be a person, device, organization, or system such as a pilot, a co-pilot, a cabin crew member, another aircraft, an EICAS, and an air traffic control tower (e.g., the air traffic control tower 120). For example, the input circuit 220 may receive audio inputs from the first communication device 160, the second communication device 170, the third communication device 180, and the fourth communication device 190, and each of the audio sources 222, 224, 226, 228 may be associated with any of the first communication device 160, the second communication device 170, the third communication device 180, and the fourth communication device 190.

In some embodiments, the input circuit 220 includes a digital audio conversion device configured to convert the received audio signals to digital audio. The digital audio conversion device may include compression, storage, processing, and transmission components. In some embodiments, the digital audio conversion device alters the digital audio by processing the audio signals to filter or apply other effects to the audio signals. The digital audio conversion device may be configured to compress the digital audio according to an audio data compression technique such as, for example, MP3, Advanced Audio Coding (AAC), Ogg Vorbis, and Free Lossless Audio Codec (FLAC) or any other suitable audio compression technique such that the communications sequencing device 150 may be tailored for a specific application. In order to interface with digital audio, components such as the audio sequencing circuit 210, the input circuit 220, the prioritizing circuit 250, the playback circuit 260, the memory 240, and the output circuit 230 may include a digital audio interface.

The output circuit 230 is configured to transmit or otherwise provide the prioritized audio output 232 to a user device. The output circuit 230 may be a transmitter, transmitter array, or other device configured to provide audio signals to a device configured to play audio signals. For example, the output circuit 230 may include various types of transmitters, either alone or in combination, such as AM transmitters, FM transmitters, digital transmitters, radio transmitters, electromagnetic transmitters, and other suitable transmitters such that the communications sequencing device 150 may be tailored for a target application. In some embodiments, the input circuit 220 and the output circuit 230 may be the same circuit.

The memory 240 may include database components, object code components, script components, or any other type of information structure for supporting the various activities and information structures described in the inventive concepts of the present disclosure. The memory 240 may be communicably connected to a field-programmable gate array, a processor, or a processing circuit, such as the playback circuit 260, and may include computer code for executing (e.g., by the processor or processing circuit) one or more processes described herein. In some embodiments, audio signals may be stored in a memory external to the communications sequencing device 150. In such configurations, the memory 240 may be connected to an external memory (e.g., auxiliary memory) source. The external memory source may be an external hard drive, an external USB drive, flash memory, optical disk, magnetic disk, CD, DVD, Blu-ray, M-Disc, solid-state drives, cloud storage, smart cloud storage, and other external memory sources such that the communications sequencing device 150 may be tailored for a target application. In some embodiments, the memory 240 may copy to or store audio signals on an event data recorder (e.g., an aircraft "black box").

The audio sequencing circuit 210 may include the prioritizing circuit 250 and the playback circuit 260. In some embodiments, the audio sequencing circuit 210, the prioritizing circuit 250, and the playback circuit 260 are one or more hardware devices, such as a field-programmable gate array including programmable logic blocks and logic gates that may be configured according the inventive concepts disclosed herein. The prioritizing circuit 250 is configured to assign a priority to audio signals received from the first audio source 222, the second audio source 224, the third audio source 226, and the fourth audio source 228. For example, the prioritizing circuit 250 may prioritize audio signals that are simultaneously received based on which audio source is transmitting the audio signals. For example, the prioritizing circuit 250 may assign a higher priority to audio communications received from an EICAS than communications received from a device associated with a cabin crew member (e.g., the third communication device 180). In another example, the prioritizing circuit 250 may prioritize simultaneous audio signals based on a detected word or phrase. For example, the prioritizing circuit 250 may assign a higher priority to audio communications when the word "fire" or "pull up" is detected in the communication signal over other communication signals. In some embodiments, the prioritizing circuit 250 assigns priorities to received audio signals in response to at least a portion of a first audio signal overlapping at least a portion of a second audio signal. For example, the prioritizing circuit 250 may assign a priority to an incoming audio signals regardless of whether other audio signals are being simultaneously received. In another example, the prioritizing circuit 250 assigns a priority to an incoming audio signal only if the incoming audio signal would overlap a portion of another audio signal.

In some embodiments, the prioritizing circuit 250 is configured to assign a priority to each audio signal from the various individual sources based on the relative importance of one individual source compared to another during a certain phase of flight. For example, audio signals received from the various audio sources 222, 224, 226, 228 may be assigned a different priority based on whether the aircraft 110 is in a takeoff phase, cruising phase, or landing phase of flight. For example, the audio signals of the second audio source 224 associated with a co-pilot may be assigned a higher priority than audio signals of the fourth audio source 228 associated with an air traffic control tower if the aircraft 110 is in a takeoff phase of flight while the audio signals of the fourth audio source 228 may be assigned a higher priority than audio signals of the second audio source 224 if the aircraft 110 is in a cruising phase of flight. In some embodiments, the prioritizing circuit 250 is configured to assign a priority to each audio signal from the various individual sources based on a time of day (e.g., morning, night, afternoon). In some embodiments, the prioritizing circuit 250 is configured to assign a priority to each audio signal from the various individual sources based on a condition external to the aircraft (e.g., thunderstorms, rain, lightning, hail, birds, volcanic ash). In some embodiments, the prioritizing circuit 250 is configured to determine a source of an audio signal based on a frequency used by a communication device transmitting the audio signal and a database of known frequencies and associated communication devices or audio sources. For example, in some embodiments, the prioritizing circuit 250 is configured to determine the source of an audio signal, and a priority of the audio signal, based on known frequencies used by an airport or air traffic control tower.

In some embodiments, the prioritizing circuit 250 is configured to assign a priority to the audio signals based on a characteristic of an audio profile of the audio signals. For example, the prioritizing circuit 250 may assign a priority to an audio signal based on a variation of volume, pitch, quality, duration, or abruptness of the audio signal. In some embodiments, the prioritizing circuit 250 may assign priorities based on static priority schemes such that the same audio sources always have priority over others throughout the course of a flight. In some embodiments, the prioritizing circuit 250 may assign more than one type of priority to an audio signal. For example, the prioritizing circuit 250 may assign a first priority type to an audio signal based on the source of the audio signal (e.g., an EICAS), and a second priority type to an audio signal based on a characteristic of the audio signal (e.g., a duration of the audio signal). For example, an audio signal received from an EICAS may be assigned a higher first priority type than an audio signal from an air traffic control tower. If two audio signals are received from the air traffic control tower, whichever audio signal from the air traffic control tower having a shorter duration may be assigned a higher second priority type. Audio sources may be outputted to a user device first based on the first priority type and then based on the second priority type. In another example, if two audio signals are simultaneously received but one of the audio signals stops while the other audio signal continues (e.g., one audio signal has a shorter duration than the other), the prioritizing circuit 250 may be configured to assign a higher priority to the shorter audio signal such that the shorter audio signal is provided as the prioritized audio output 232 while the longer audio signal is recorded in the memory 240 (e.g., to be sequenced after the output of the shorter audio source has completed).

The playback circuit 260 is configured to determine which of the audio signals from the audio sources 222, 224, 226, 228 has the highest priority and to prepare the audio signals for playback by the output circuit 230. The playback circuit 260 may be configured to sequence the audio signals for playback as a prioritized audio output 232 or to determine which audio signals are provided to a listener as the prioritized audio output 232 and which audio signals are stored in the memory 240 to be played back at a later time, if at all. In one embodiment, only the audio signal having the highest priority is provided to the output circuit 230 for immediate playback (e.g., in real time). The playback circuit 260 is configured to store any remaining audio signals having a lower priority in the memory 240. For example, if the communications sequencing device 150 simultaneously receives audio signals from the first audio source 222 having a high priority, the second audio source 224 having a low priority, and the third audio source 226 having a medium priority, the playback circuit 260 may sequence the audio sources such that the audio signals from the first audio source 222 is outputted first, the audio signals from the third audio source 226 is outputted second, and the audio signals from the second audio source 224 is outputted last. In some embodiments, the audio signals from the second audio source 224 may not initially be played back as part of the prioritized audio output 232 and instead stored in the memory 240.

In some embodiments, the playback circuit 260 sequences the audio signals based on audio signals of a certain priority overlapping one another when played back in real time via the output circuit 230. For example, during a conversation between a pilot (e.g., the first audio source 222) and a co-pilot (e.g., the second audio source 224) of an aircraft, the playback circuit 260 may sequence each audio signal to be played back in real time such that the audio signals are allowed to overlap one another but once an audio signal received from an air traffic controller (e.g., fourth audio source 228) is received and assigned a "high" priority by the prioritizing circuit 250, the playback circuit 260 sequences each audio source to be outputted as the prioritized audio output 232. Following this example, in some embodiments, the playback circuit 260 may be configured to reroute the audio signals from the first audio source 222 and the second audio source 224 to the memory 240 while only providing the audio signals received from the fourth audio source 228 to the output circuit 230 to be played back in real time. Accordingly, based on the example above, the pilot may be initially provided with audio signals originating from the co-pilot but once the audio signals from the air traffic controller are received, the output circuit 230 only provides the pilot with the audio signals from the air traffic controller and the pilot accordingly no longer hears what the co-polite is saying. In some embodiments, the playback circuit 260 causes the audio signals originating from the co-pilot to be provided to pilot after the audio signals provided by the air traffic controller have ended or during gaps in transmission of the audio signals provided by the air traffic controller. In some embodiments, the playback circuit 260 sequences at least one of the audio signals based on an order of receiving the audio signals or the assigned priority of an audio signal. In some embodiments, the playback circuit 260 sequences the audio signals based on the order of receiving the audio signals and based on the assigned priorities. In some embodiments, the playback circuit 260 sequences an audio signal based on a user input.

In some embodiments, the playback circuit 260 delays providing a received audio signal to the output circuit 230 and instead stores the delayed audio signal in the memory 240 for playback at a later time (e.g., immediately after a higher priority audio signal has finished playing, once the aircraft has landed). For example, once an audio signal warning of a low fuel condition received from an EICAS (e.g., a high priority audio signal) has finished being provided to a pilot, the playback circuit 260 may provide the pilot with delayed or recorded lower priority audio signals stored in the memory 240 via the output circuit 230. In some embodiments, the communications sequencing device 150 is configured to receive a playback input from a device receiving the prioritized audio output 232 instructing the communications sequencing device 150 to playback any delayed or recorded audio signals stored in the memory 240. For example, the playback input may include operations such as skipping, fast forwarding, rewinding, pausing, and editing a playback speed (e.g., 0.8x, 1.2x, 2.0x) of an audio signal stored in the memory 240 and later provided to the user device.

The notification device 270 may be configured to provide notifications to a user device receiving the prioritized audio output 232. In some embodiments, the notification may indicate that the prioritized audio output 232 is currently being provided, that any delayed audio signals will be provided once higher priority signals have finished being received, and that some audio signals will not be played back. For example, in some embodiments, the notification device 270 may provide a listener with a message indicating that not all audio signals will be provided to the listener. In some embodiments, the notification may prompt the listener to take an action if the listener wishes to hear any audio signals stored in the memory 240. The notification device 270 may include various notification mechanisms such as, for example, a light (e.g., light-emitting diode (LED), lamp, light panel, indicator light), a head-up display (HUD) indicator (e.g., head-mounted display (HIVID)), tactile feedback (e.g., vibration of handle, seat, steering wheel), and a speaker configured to provide a sound to the user.

In some embodiments, the notification device 270 is configured to provide a sound to the user indicating that the prioritized audio output is being provided. The notification device 270 may be configured to utilize different notification mechanisms for different simultaneous audio signals. For example, the user may hear a first sound (e.g., a chime) when a first audio signal from a first audio source (e.g., the first audio source 222) is being delayed and a second sound (e.g., a beep) when a second audio signal from a second audio source is being delayed. In one embodiment, the notification device 270 is configured to provide a voice notification or text notification to the user indicating the source of the current audio signal being played and the source of audio signals that are currently delayed or will not be played. For example, a text notification stating the source of a current audio feed may be displayed on a windshield of the aircraft 110.

The notification device 270 may be configured to provide additional notification information to the user about audio signals that are currently being provided to the user, delayed, or stored in the memory 240 and not sequenced by the playback circuit 260 for playback. For example, the notification information may include a duration of an audio signal currently being played or stored, a source of an audio signal currently being played or stored, and a time stamp of an audio signal audio signal currently being played and previously stored. In some embodiments, the notification device 270 is configured to provide a full or partial textual transcription of an audio signal that is currently being provided to the user, delayed, or stored in the memory 240 and not sequenced by the playback circuit 260 for playback. In one embodiment, the notification device 270 is configured to provide a textual summary to the user of an audio signal that is currently being provided to the user, delayed, or stored in the memory 240 and not sequenced by the playback circuit 260 for playback. In some embodiments, the notification device 270 may be configured to provide a textual transcription of stored audio signals while the user receives different audio signals in the prioritized audio output 232. In some embodiments, multiple audio signals may be provided at the same time such that a first audio signal is provided via a left speaker (e.g., to a left ear of the user) and a second audio signal is provided via a right speaker (e.g., to a right ear of the user).

In some embodiments, the prioritizing circuit 250 may assign different priorities to delayed audio signals based on the priority assigned to later-received audio signals. For example, after assigning a high, medium, and low priority to a first, second, and third audio signal, respectively, the prioritizing circuit 250 may assign a high-plus priority to a fourth audio signal received after the first, second, and third audio signals. In the same example, the playback circuit 260 may be configured to alter the prioritized audio output 232 to interrupt the audio signal currently being played back and to provide the fourth audio signal having the highest assigned priority. In some embodiments, the priority assigned to an audio signal by the prioritizing circuit 250 is increased based on how long the audio signal has been delayed for playback. For example, if an audio signal has been delayed for a certain period of time (e.g., thirty seconds, a minute, more than five minutes), the prioritizing circuit 250 may increase the assigned priority level of the delayed audio signal. In some embodiments, the prioritizing circuit 250 may decrease the priority assigned to a particular delayed audio signal.

In some embodiments, the notification device 270 is configured to provide a notification to a device associated with an audio signal received by the communications sequencing device 150 but has not been provided to the user via the prioritized audio output 232 due to the prioritizing circuit 250 assigning a low priority to the audio signal or due to the playback circuit 260 not sequencing the audio signals for playback. For example, the notification device 270 may provide a notification to the device associated with the audio signal indicating the assigned priority level of the audio signal, or that the audio signal has not yet been played back, or that the audio signal will not be played back and instead stored in the memory 240. As such, a person or device originating an audio signal that is not sequenced by the playback circuit 260 for playback to its intended recipient will know that the intended recipient did not hear their message and can attempt to communicate their message to the intended recipient again if desired.

Figure 3:
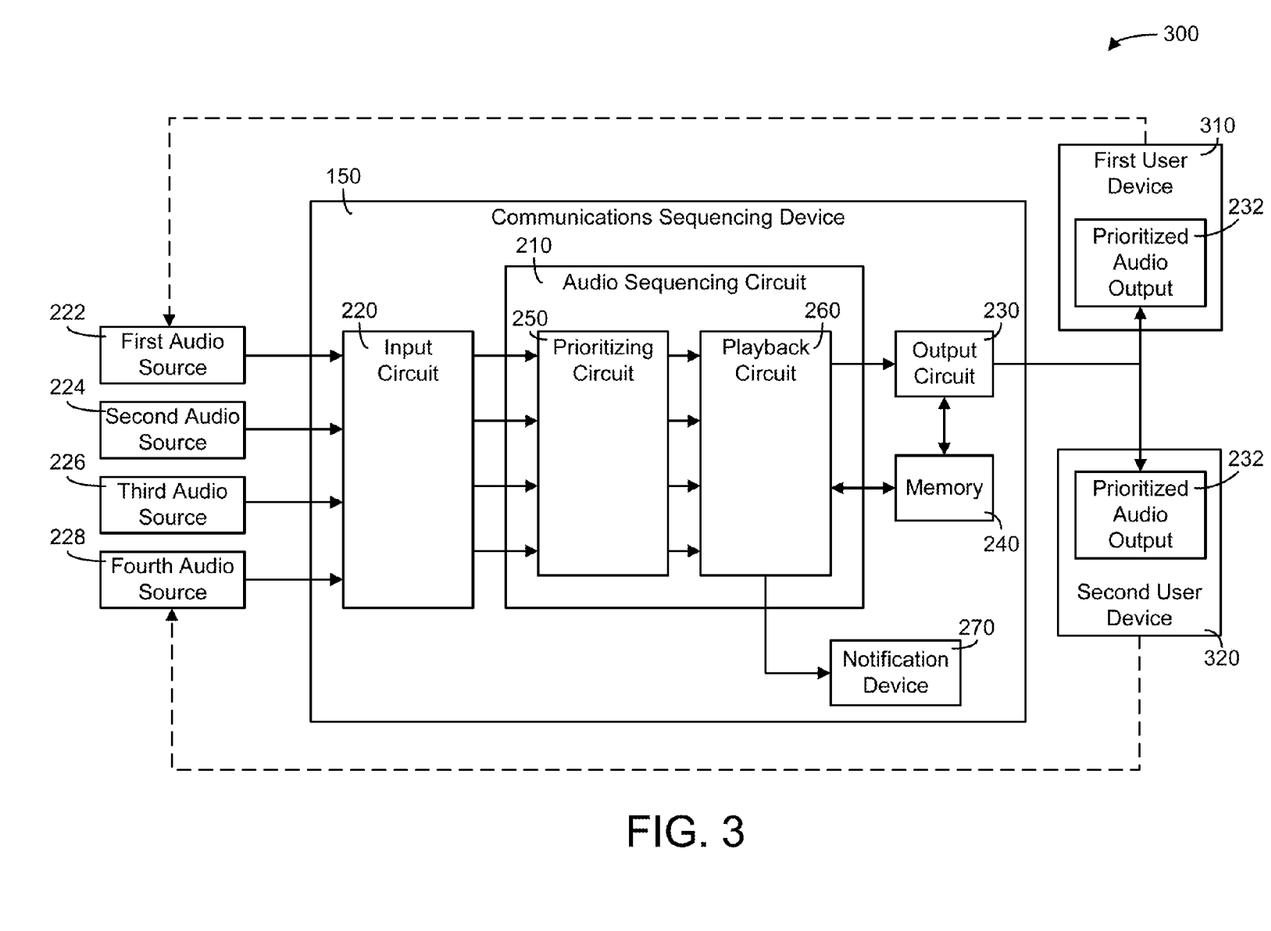
FIG. 3 is an exemplary embodiment of a communications system including the communications sequencing device of FIG. 1, according to the inventive concepts disclosed herein.

Referring now to FIG. 3, an exemplary embodiment of a communications system 300 including the communications sequencing device 150 of FIG. 1 is shown according to the inventive concepts disclosed herein. The communications sequencing device 150 is configured to receive a plurality of audio inputs from a plurality of audio devices, such as the first audio source 222, the second audio source 224, the third audio source 226, and the fourth audio source 228. The communications system 300 is further shown to include a first user device 310 and a second user device 320. Each of the first user device 310 and the second user device 320 is configured to receive audio signals from the output circuit 230 of the communications sequencing device 150. For example, as shown in FIG. 3, the first user device 310 and the second user device 320 both receive the prioritized audio output 232. In some embodiments, the output circuit provides the same prioritized audio output 232 (e.g., a set of sequenced audio signals) to both the first user device 310 and the second user device 320. In some embodiments, the output circuit provides the different prioritized audio outputs to the first user device 310 and the second user device 320. The playback circuit 260 may be configured to sequence audio signals differently for different user devices based on a characteristic of a source of the audio signal, an audio characteristic of the audio signals, and based on a characteristic of the user device. In some embodiments, the audio characteristic of the audio signals may be based on a content, a loudness, a rate, and a frequency (e.g., a communication channel frequency, a duration as determined by a level detection circuit, and a rate of consecutive communications from a single source).

As shown in FIG. 3, the first user device 310 and the second user device 320 are configured to transmit audio signals. The first user device 310 is configured provide the first audio source 222 to the communications sequencing device 150 and the second user device 320 is configured to provide the fourth audio source 228 to the communications sequencing device 150. The first user device 310 and the second user device 320 may be any suitable devices capable of transmitting and receiving audio signals, such as a headset, a telephone, a two-way radio, and other such devices such that the communications sequencing device 150 may be tailored for a target application.

Figure 4:
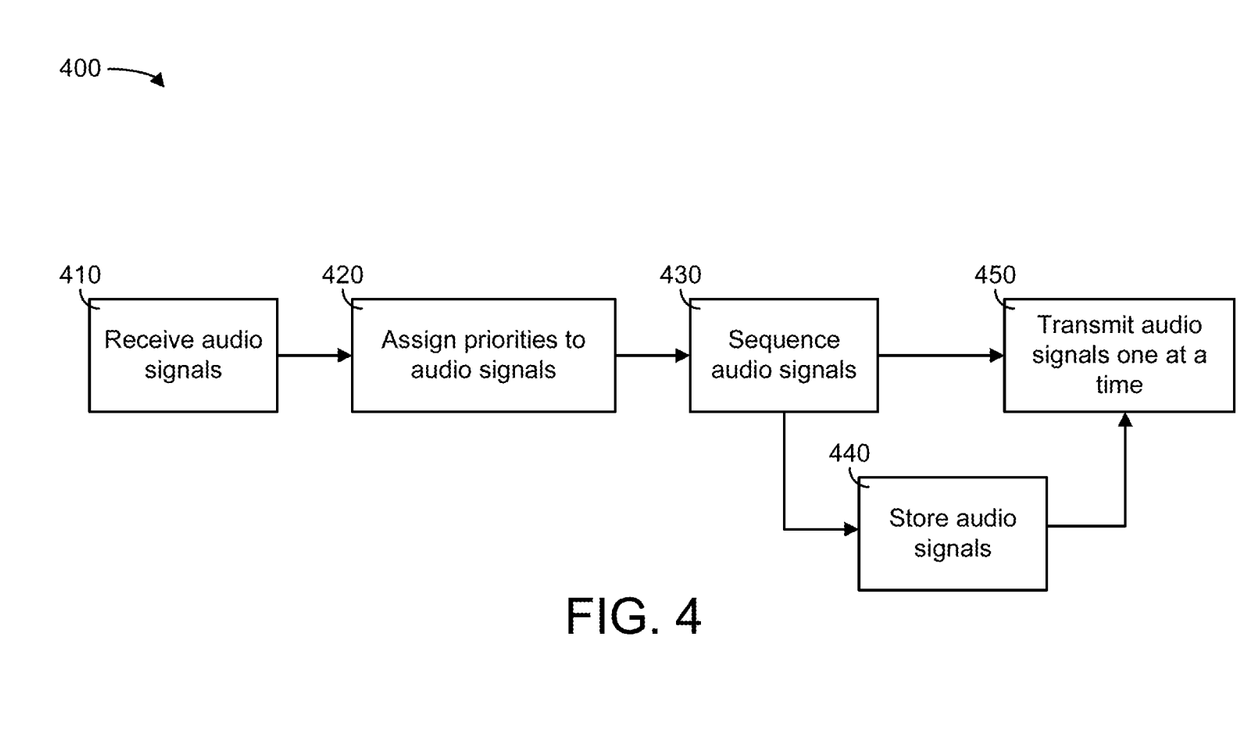
FIG. 4 is an exemplary embodiment of a method for sequencing audio communications, according to the inventive concepts disclosed herein.

Referring now to FIG. 4, an exemplary embodiment of a method 400 for sequencing audio communications is shown according to the inventive concepts disclosed herein. The method 400 may be implemented using any of the systems and devices disclosed herein, such as the communications sequencing device 150.

At step 410, audio signals are received. In some embodiments, an input circuit (e.g., the input circuit 220) of a communications sequencing device (e.g., the communications sequencing device 150) is configured to receive a first audio signal from a first audio source (e.g., the first communication device 160) and a second audio signal from a second audio source (e.g., the second communication device 170). In some embodiments, the input circuit receives audio signals from more than two sources (e.g., also from the third communication device 180, and the fourth communication device 190). The input circuit may simultaneously receive the audio signals from the various sources. In some embodiments, audio signals are converted to digital audio.

At step 420, a priority is assigned to each audio signal. In some embodiments, a prioritizing circuit (e.g., the prioritizing circuit 250) assigns a first priority to the first audio signal and a second priority to the second audio signal. In some embodiments, a priority is assigned to each audio signal based on a characteristic of each audio source. For example, priorities may be assigned based on which audio source is transmitting the audio signals, based on the content of the audio signals (e.g., using word detection algorithms), and based on the relative importance of one individual source compared to another during a certain phase of flight. For example, audio signals received from a communication device associated with a pilot of the aircraft may be assigned a higher priority than audio signals received from a communication device associated with an air traffic control station. In another example, audio signals received from a communication device associated with an air traffic control station may be assigned a higher priority than audio signals received from a communication device associated with a pilot of the aircraft and further based on the aircraft being a landing phase of flight. For example, a prioritizing circuit may assign a priority to an audio signal based on both of a source of the audio signal and a characteristic of the audio signal. In another example, a prioritizing may assign a priority to an audio signal based on either one of a source of the audio signal or a characteristic of the audio signal. In some embodiments, the prioritizing circuit dynamically assigns a priority to received audio signals based on a communication channel that a communication device receiving the prioritized output is tuned to. For example, if a device receiving the prioritized output is tuned to an emergency communication channel, a prioritizing circuit may assign higher priorities to emergency communications than non-emergency communications, but if the device receiving the prioritized output is not tuned to an emergency communication channel then the prioritizing circuit may assign priorities to incoming audio signals based on other criteria (e.g., the source of the audio signals or a characteristic of the audio signals).

At step 430, the audio signals are sequenced. In some embodiments, a playback circuit (e.g., the playback circuit 260) sequences the audio signals based on the assigned priorities. In one embodiment, only the audio signal having the highest priority is provided to the output circuit for immediate playback. At step 440, at least some of the audio signals are stored. In some embodiments, the playback circuit is configured to store any remaining audio signals not immediately played back in a storage device (e.g., the memory 240). In some embodiments, the audio signals that are not immediately played are delayed for as long as higher priority audio signals take to be played and then the lower priority audio signals are outputted in sequence one after the other such that no two audio signals are outputted at the same time even if the audio signals were simultaneously received by the communications device.

At step 460, at least some of the audio signals are outputted. In some embodiments, an output circuit (e.g., the output circuit 230) outputs at least some of the audio signals to a user device one at a time based on the sequence of the audio signals. In some embodiments, the output circuit first outputs the highest priority audio signal, then the second highest priority audio signal, then the third highest audio signal, and so on. The output circuit may transmit the audio signals to using various digital audio broadcasting technologies such as radio, HD radio, digital audio broadcasting (DAB), DAB+, NRSC-5, NRSC-5-C, Eureka 147, digital radio mondiale (DRM), DRM30, in-band on-channel (IBOC), CAM-D, and other suitable digital audio broadcasting technologies such that the communications sequencing device 150 may be tailored for specific applications and uses.

In some embodiments, it may be desirable for an audio source to transmit audio signals but not to receive audio signals from the communications sequencing device 150. For example, the second communication device 170 may not have a need to receive audio signals (e.g., if the second communication device 170 is an EICAS). Accordingly, the second communication device 170 may be configured to transmit audio signals and not configured to receive audio signals.

It will be appreciated that the audio signals may be transmitted by various wireless communications technologies such as radio, free-space optical, infrared (IR), sonic, ultrasonic, electromagnetic induction, WiFi, land mobile radio, specialized mobile radio, VHF radios, airband, cellular communications (e.g., 3G, 4G), wireless USB, Bluetooth, LiFi, NFC, ZigBee, TransferJet, Ultra-wideband, WiMAX, LMDS, HiperMAN, and other suitable wireless communications technologies. It will also be understood that the audio signals may be transmitted via wired communications technologies such as USB, USB-C, USB 3.0, micro USB, fiber optics, coaxial, HDMI, and other wired communication technologies.

While the communications sequencing device 150 has been shown and described to operate with respect to audio signals, it should be understood that a similar capability may be utilized with video signals. For example, a videoconferencing party line could implement the communications sequencing device 150. While references are made to the communications sequencing device 150 operating between an aircraft (e.g., the aircraft 110), air traffic controller, pilot, co-pilot, cabin (e.g., the cabin 140), and EICAS, it will be appreciated that the communications sequencing device 150 can be implemented on a variety of systems apart from an aircraft or aviation implementation, such as between ground-based vehicles, water-based vehicles, command posts. In another example, a space-based vehicle, spaced-based object (e.g., space station, satellite, orbiter), and command post combination could also utilize the communications sequencing device 150.

Additionally, a teleconference calling service could implement the communications sequencing device 150. For example, a typical teleconferencing calling service may exhibit instances of simultaneous communications during, for example, brief name announcements and brief comments. The communications sequencing device 150 may be used to eliminate simultaneous communications that interrupt one another on a teleconference calling service during such instances. Further, the communications sequencing device 150 may facilitate increased duration of talking time for a primary speaker on a teleconference calling service. For example, if the primary speaker is assigned the highest priority amongst all the speakers on the call, small interruptions by the other speakers may not be heard until after the primary speaker has finished talking, thereby preventing the primary speaker from being interrupted during an important dialog. Following this example, the volume of the primary speaker may be increased by the communications sequencing device 150. In some embodiments, the priorities of the speakers in a teleconference call may be assigned based on roles within an organization or conference assembly.

The inventive concepts disclosed herein are described above with reference to drawings. These drawings illustrate certain details of specific embodiments that implement the systems and methods and programs of the inventive concepts disclosed herein. However, describing the inventive concepts disclosed herein with drawings should not be construed as imposing on the inventive concepts disclosed herein any limitations that may be present in the drawings. The inventive concepts disclosed herein contemplate methods, systems and program products on machine-readable media capable of accomplishing its operations. The embodiments of the inventive concepts disclosed herein may be implemented using an existing computer processor, or by a special purpose computer processor incorporated for this or another purpose or by a hardwired system. No claim element herein is to be construed under the provisions of 35 U.S.C. § 112, sixth paragraph, unless the element is expressly recited using the phrase "means for." Further, no element, component or method step of the inventive concepts disclosed herein are intended to be dedicated to the public, regardless of whether the element, component or method step is explicitly recited in the claims.

Some embodiments of the disclosure are described in the general context of method steps which may be implemented in one embodiment by a program product including machine-executable instructions, such as program code, for example, in the form of program modules executed by machines in networked environments. The program modules may include routines, programs, objects, components, data structures, and so on, that perform particular tasks or implement particular data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments may use computer networks, intranets, and the Internet, and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

It should be noted that although the flowcharts and diagrams provided herein may show a specific order of method steps, it is understood that the order of these steps may differ from what is depicted. Also two or more steps may be performed concurrently or with partial concurrence. Such variation may depend on the software and hardware systems chosen and on designer choice. It is understood that all such variations are within the scope of the disclosure. Likewise, software and web implementations of the present disclosure may be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. An audio sequencing device, comprising:
an input circuit configured to receive a plurality of audio signals, including a first audio signal from a first audio source and a second audio signal from a second audio source, the input circuit configured to determine an order in which the plurality of audio signals are received;
a prioritizing circuit configured to assign a first priority to the first audio signal and a second priority to the second audio signal in response to at least a portion of the first audio signal overlapping at least a portion of the second audio signal;

a playback circuit configured to sequence at least one of the audio signals of the plurality of audio signals based on the order and the assigned priorities;

an output circuit configured to transmit the audio signals to a user device one at a time based on the sequence, the order, and the assigned priorities of the audio signals;

a memory configured to store the sequenced audio signals; and a notification device configured to provide a notification to the user device indicating that at least one stored audio signal is available for playback while at least one of the audio signals is being transmitted to the user device, the notification based on at least one of the at least one stored audio signal available for playback and at least one audio source associated with the at least one stored audio signal available for playback.

2. The audio sequencing device of claim 1, wherein the playback circuit is further configured to sequence the audio signals based on which audio signal is assigned a higher priority by comparing the first priority and the second priority, and wherein the output circuit is further configured to first transmit the audio signal comprising the higher priority to the user device before transmitting the audio signal comprising a lower priority.

3. The audio sequencing device of claim 1, wherein the notification comprises at least one of a textual notification, a visual notification, and a tactile notification.

4. The audio sequencing device of claim 1, wherein the prioritizing circuit is further configured to assign the first and second priority based on at least one of a characteristic of at least one of the audio sources and a characteristic of at least one of the audio signals.

5. The audio sequencing device of claim 4, wherein the characteristic of the at least one of the audio sources comprises a type of person, device, or station associated with the audio source, and wherein the type of person, device, or station comprises at least one of a pilot, a co-pilot, a navigator, a flight cabin crew member, an air traffic control facility, an air traffic controller, an EICAS, a satellite communications system, an airline or company operations base, and another aircraft.

6. The audio sequencing device of claim 4, wherein the characteristic of the audio signals comprises at least one of a content, a duration, a rate of consecutive communications from a same audio source, and a loudness of the audio signals.

7. The audio sequencing device of claim 1, wherein the prioritizing circuit is further configured to assign the first priority and the second priority based on a phase of flight of an aircraft, and wherein the phase of flight of the aircraft comprises at least one of a takeoff phase, a cruising phase, and a landing phase.

8. The audio sequencing device of claim 1, wherein the input circuit is further configured to receive a third audio signal from a third audio source, and wherein the prioritizing circuit is further configured to assign a third priority to the third audio signal and to reassign priorities to each of the first audio signal and the second audio signal based on the third audio signal.

9. The audio sequencing device of claim 1, further comprising a memory configured to store the sequenced audio signals, wherein the playback circuit is further configured to sequence the audio signals based on which audio signal is assigned a higher priority by comparing the first priority and the second priority, wherein the output circuit is further configured to transmit the audio signal comprising the higher priority to the user device, and wherein the output circuit is further configured to store the audio signal comprising a lower priority and the audio signal comprising the higher priority to the memory.

10. A method of sequencing audio communication signals, the method comprising:

receiving, by an input circuit of a communications sequencing device, a plurality of audio signals, including a first audio signal from a first audio source and a second audio signal from a second audio source;

assigning, by a prioritizing circuit of the communications sequencing device, a first priority to the first audio signal and a second priority to the second audio signal in response to at least a portion of the first audio signal overlapping at least a portion of the second audio signal;

sequencing, by a playback circuit of the communications sequencing device, at least one of the audio signals of the plurality of audio signals based on an order of receiving the audio signals and the assigned priorities;

outputting, by an output circuit of the communications sequencing device, the audio signals to a user device one at a time based on the sequence and the assigned priorities of the audio signals; and providing, by a notification device, a notification to the user device indicating that at least one stored audio signal is available for playback while the audio signals are being output to the user device, the notification based on at least one of the audio signals being output to the user device and an audio source associated with at least one of the audio signals being output to the user device.

11. The method of claim 10, wherein sequencing the audio signals is based on comparing, by the playback circuit, the first priority and the second priority to determine which audio signal is assigned a higher priority.

12. The method of claim 11, wherein outputting the audio signals to the user device comprises providing the audio signal comprising the higher priority to the user device before providing the audio signal comprising a lower priority to the user device.

13. The method of claim 11, further comprising storing the audio signal comprising a lower priority and the audio signal comprising the higher priority to the memory, and wherein outputting the audio signals to the user device comprises providing the audio signal comprising the higher priority to the user device.

14. The method of claim 10, wherein the notification is at least one of a textual notification, a visual notification, and a tactile notification.

15. The method of claim 10, wherein assigning the first and second priority is based on at least one of a characteristic of at least one of the audio sources and a characteristic of at least one of the audio signals, wherein the characteristic of the at least one of the audio sources comprises a type of person, device, or station associated with the audio source, and wherein the characteristic of the audio signals comprises at least one of a content, a communication channel frequency, a duration, a rate of consecutive communications from a same audio source, and a loudness of the audio signals.

16. The method of claim 10, wherein assigning the first priority and the second priority is based on a phase of flight of an aircraft, and wherein the phase of flight of the aircraft comprises at least one of a takeoff phase, a cruising phase, and a landing phase.

17. A communications system comprising:
a plurality of audio communication devices configured to simultaneously transmit a plurality of audio signals; and
at least one processor communicably coupled with the plurality of audio communication devices and a non-transitory processor-readable medium storing processor-executable code for causing the at least one processor to:
- simultaneously receive an audio signal from each audio communication device of the plurality of audio communication devices;
- assign a priority to each audio signal based on a characteristic of at least one of a plurality of audio sources and a characteristic of at least one of the audio signals, wherein the priority is assigned in response to at least a portion of a first audio signal of the plurality of audio signals overlapping at least a portion of a second audio signal of the plurality of audio signals;
- sequence at least one of the audio signals for playback based on at least one of an order of receiving the audio signals and the assigned priorities;
- output the audio signals to a user device one at a time based on the sequence and the assigned priorities of the audio signals; and
- produce a notification indicating that the first audio signal is not being output to the user device while the second audio signal is being output to the user device, the notification based on at least one of the first audio signal and an audio source associated with the first audio signal.

18. The communications system of claim 17, wherein the characteristic of the audio sources comprises a type of person, device, or station associated with the audio source, and wherein the type of person, device, or station comprises at least one of a pilot, a co-pilot, a navigator, a flight cabin crew member, an air traffic control facility, an air traffic controller, an EICAS, a satellite communications system, an airline or company operations base, and another aircraft.

19. The communications system of claim 17, wherein the characteristic of the audio signals comprises at least one of a content, a duration, a rate of consecutive communications from a same audio source, and a loudness of the audio signals.

20. The communications system of claim 17, wherein the processor-executable code further causes the at least one processor to receive an additional audio signal from an additional communications device, and reassign the priority of each of the plurality of audio signals based on receiving the additional audio signal.

* * * * *